(12) United States Patent
Chen et al.

(10) Patent No.: US 10,352,412 B2
(45) Date of Patent: Jul. 16, 2019

(54) GEAR ARRANGEMENT

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 23 days.

(21) Appl. No.: 15/658,383

(22) Filed: Jul. 24, 2017

(65) Prior Publication Data
US 2018/0266527 A1  Sep. 20, 2018

(30) Foreign Application Priority Data

Mar. 20, 2017  (TW) .............................. 106109439 A (51) Int. Cl.
| | |
|---|---|
| F16H 19/04 | (2006.01) |
| A47B 88/49 | (2017.01) |
| F16H 57/00 | (2012.01) |
| F16H 55/26 | (2006.01) |
| A47B 88/57 | (2017.01) |
| A47B 88/497 | (2017.01) |

(52) U.S. Cl.
CPC ............ *F16H 19/04* (2013.01); *A47B 88/49* (2017.01); *A47B 88/57* (2017.01); *F16H 55/26* (2013.01); *F16H 57/0006* (2013.01); *A47B 88/497* (2017.01); *A47B 2210/0048* (2013.01); *F16H 2019/046* (2013.01)

(58) Field of Classification Search
CPC ...... F16H 19/04; F16H 55/26; F16H 57/0006; F16H 2019/046; A47B 88/49; A47B 88/57; A47B 88/497; A47B 2210/0048
USPC ....................................... 74/89.17; 312/319.1
See application file for complete search history.

(56) References Cited

U.S. PATENT DOCUMENTS

| | | | | |
|---|---|---|---|---|
| 2,410,643 | A * | 11/1946 | Fielding ................. | F16H 55/26 74/422 |
| 5,265,487 | A * | 11/1993 | Williams ................ | F16H 19/04 74/109 |
| 6,257,303 | B1 * | 7/2001 | Coubray ................. | F16H 19/04 74/422 |
| 6,499,818 | B2 * | 12/2002 | Brustle ................ | A47B 88/467 312/319.1 |
| 7,066,044 | B2 * | 6/2006 | Kuo ........................ | F16H 19/04 74/411 |

(Continued)

FOREIGN PATENT DOCUMENTS

| | | | |
|---|---|---|---|
| DE | 20 2012 002 127 U1 | 6/2013 | |
| DE | 202012002127 U1 * | 6/2013 | ............. A47B 88/49 |

(Continued)

*Primary Examiner* — William Kelleher
*Assistant Examiner* — Gregory Robert Weber
(74) *Attorney, Agent, or Firm* — Winston Hsu (57) ABSTRACT

A gear arrangement includes a rack, a gear and a flexible member. The rack includes a plurality of teeth. The gear is configured to be engaged with the rack through the teeth. The flexible member is adjacent to an end of the rack. The flexible member is configured to rotate the gear.

10 Claims, 12 Drawing Sheets

(56) References Cited

U.S. PATENT DOCUMENTS

| | | | | |
|---|---|---|---|---|
| 7,430,937 B2 | * | 10/2008 | Rotter | F25D 25/025 |
| | | | | 74/422 |
| 8,864,249 B2 | * | 10/2014 | Nam | F25D 25/025 |
| | | | | 312/330.1 |
| 9,243,662 B2 | | 1/2016 | Bonat | |

FOREIGN PATENT DOCUMENTS

| | | | | | |
|---|---|---|---|---|---|
| EP | 1 574 151 A2 | | 9/2005 | | |
| EP | 1574151 A2 | * | 9/2005 | ............ | A47B 88/40 |
| EP | 1 959 162 A1 | | 8/2008 | | |
| GB | 436082 | | 9/1935 | | |
| GB | 637983 A | * | 5/1950 | ............ | F16H 19/04 |
| JP | S49-14919 | | 4/1974 | | |
| JP | S4914919 B1 | * | 4/1974 | | |
| JP | H02-150536 A | | 6/1990 | | |
| JP | H06-54951 U | | 7/1994 | | |
| JP | H0654951 U | * | 7/1994 | | |
| JP | H11-311055 A | | 11/1999 | | |
| JP | H11-311055 A | * | 11/1999 | ............ | E05F 5/003 |
| JP | H11311055 A | * | 11/1999 | ............ | E05F 5/003 |
| JP | 2004-52297 A | | 2/2004 | | |
| JP | 2004052297 A | * | 2/2004 | ............ | E05F 5/003 |

\* cited by examiner

GEAR ARRANGEMENT

BACKGROUND OF THE INVENTION

1. Field of the Invention

The present invention relates to a gear arrangement, and more particularly, to a gear arrangement capable of reducing noise and jolt during re-engagement of the gear arrangement.

2. Description of the Prior Art

In a furniture system, such as a cabinet system, a drawer usually can be opened or retracted relative to a cabinet through a pair of slide rail assemblies. Wherein, current technique uses a gear and a rack to engage with each other in order to improve moving stability of the drawer relative to the cabinet. For example, U.S. Pat. No. 9,243,662 B2 discloses an arrangement of a gear device. The case is provided for reference.

Figure 1:
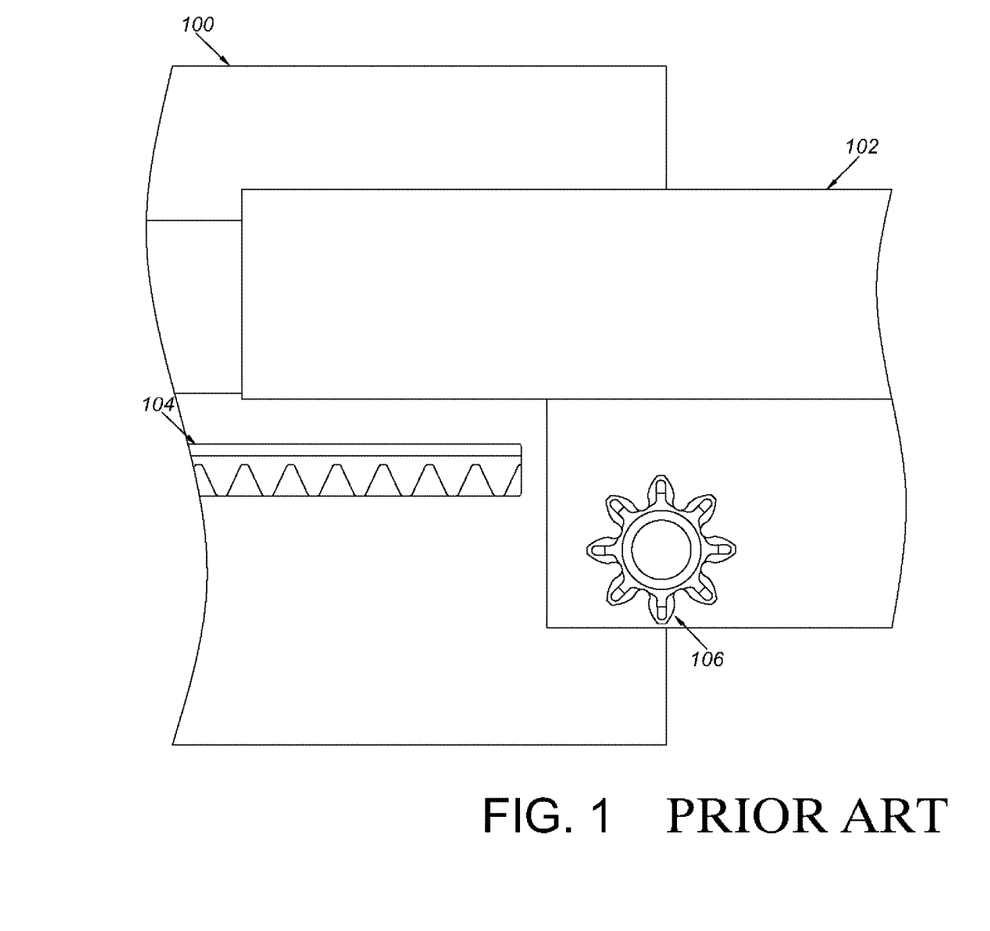
FIG. 1 is a diagram showing two slide rails relatively movable relative to each other through engagement of a rack and a gear of the prior art.

Furthermore, please refer to FIG. 1. FIG. 1 is a diagram showing a first rail 100 and a second rail 102 movable relative to the first rail 100. A rack 104 is arranged on the first rail 100, and a gear 106 is arranged on the second rail 102. Through engagement between the gear 106 and the rack 104, the second rail 102 can be stably moved relative to the first rail 100.

Figure 2:
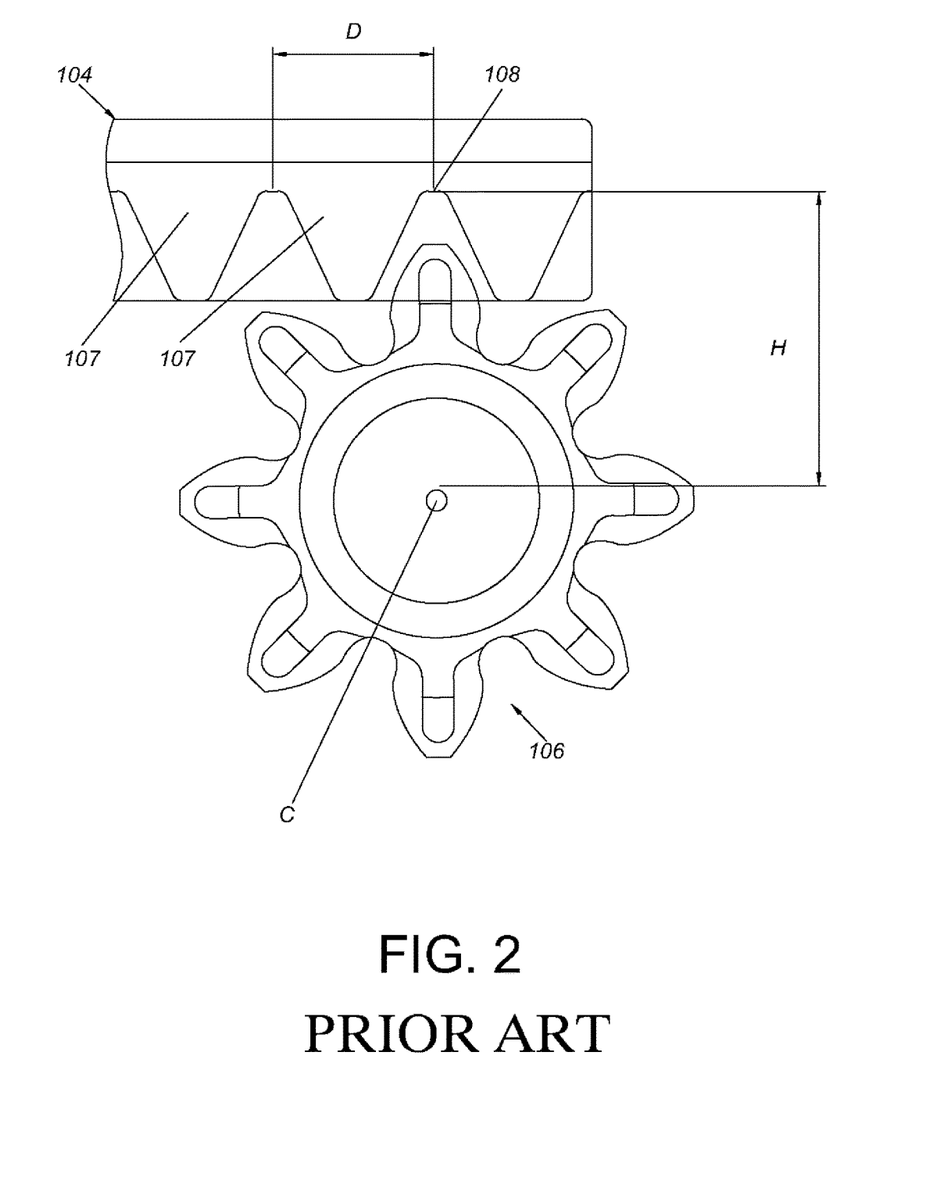
FIG. 2 is a diagram showing the gear being engaged with the rack of the prior art.

As shown in FIG. 2, the rack 104 comprises a plurality of teeth 107 arranged at predetermined intervals. Each of the teeth 107 has a predetermined width D. On the other hand, when the gear 106 is engaged with the rack 104, a predetermined distance H is defined between a center C of the gear 106 and a bottom (or a valley) 108 of a tooth 107 of the rack 104. Through the above predetermined conditions, the gear 106 can be regularly movable on the rack 104.

Figure 3:
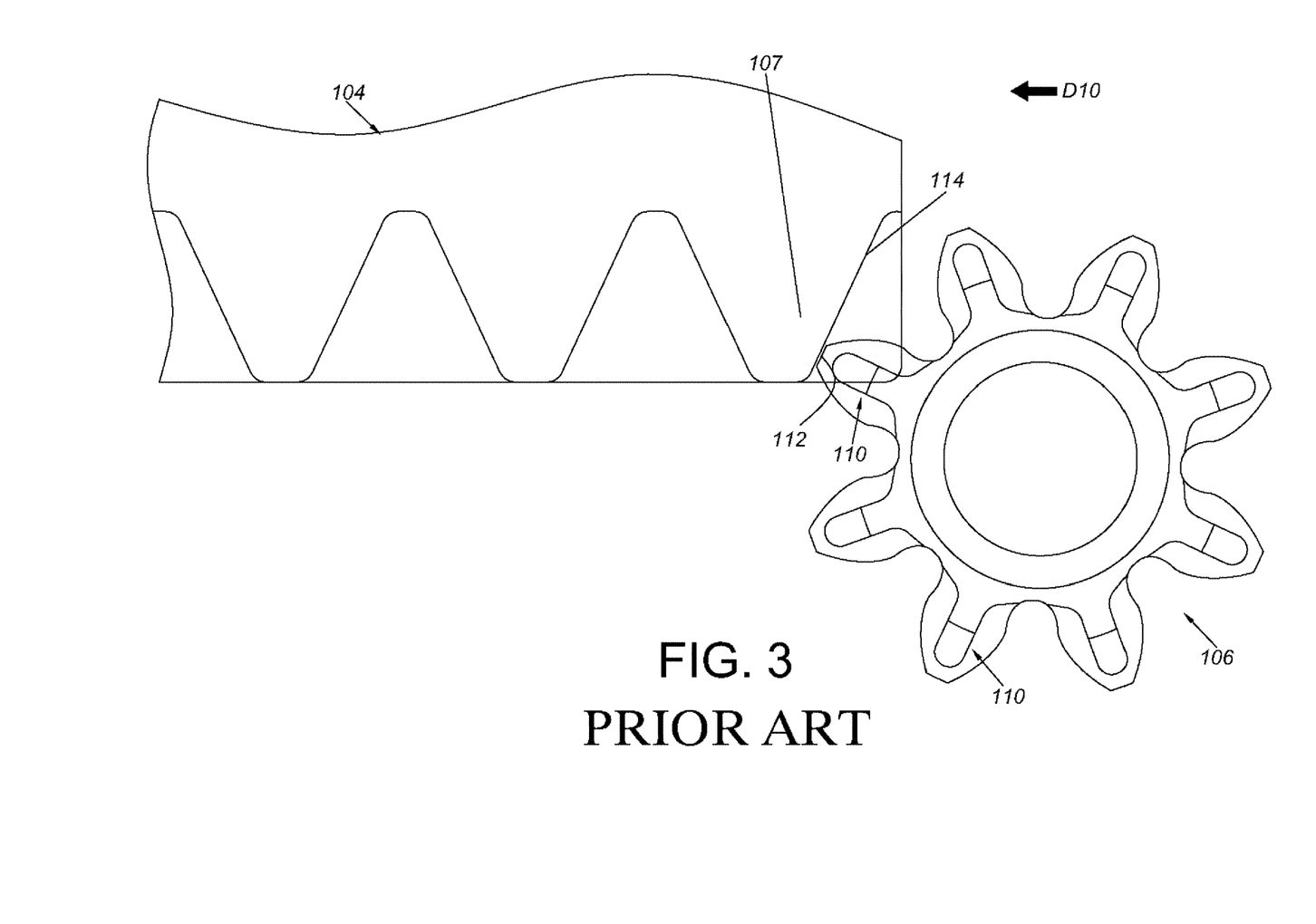
FIG. 3 is a diagram showing a tip of the gear perpendicular to a lateral side of one of teeth of the rack of the prior art.

As shown in FIG. 3, when the gear 106 is disengaged from an end part of the rack 104, and the gear 106 is going to be engaged with the end part of the rack 104 again, a user usually operates the second rail 102 to move from an open position along a direction D10. During such process, a tip 112 of one of teeth 110 of the gear 106 may be perpendicular to a lateral side 114 of one of the teeth 107 of the rack 104, so as to cause an impact, thus noise and jolt occur accordingly.

SUMMARY OF THE INVENTION

The present invention relates to a gear arrangement, and more particularly, to a gear arrangement capable of reducing noise and jolt during re-engagement of the gear arrangement.

According to an embodiment of the present invention, a gear arrangement comprises a rack having a first end part and a second end part opposite to the first end part, a plurality of teeth being arranged between the first end part and the second end part; a gear having a plurality of teeth configured to be engaged with the plurality of teeth of the rack; and a flexible member arranged on the rack, the flexible member having a flexible part longitudinally extended from a tooth adjacent to the first end part of the rack.

Preferably, a height of the flexible part of the flexible member is smaller than a height of each of the teeth of the rack.

Preferably, the flexible member is detachably connected to the rack.

Preferably, a first connecting feature is arranged on the rack. A second connecting feature is arranged on the flexible member. The first connecting feature and the second connecting feature are a combination of concave and convex structures engaged with each other.

Preferably, the flexible member and the rack are integrally formed in one piece.

According to another embodiment of the present invention, a gear arrangement applicable to a slide rail assembly comprises a rack configured to be fixedly mounted to a first rail of the slide rail assembly, and arranged along a longitudinal direction of the first rail, the rack having a first end part and a second end part opposite to the first end part, a plurality of teeth being arranged between the first end part and the second end part; a gear configured to be rotatably mounted to a second rail of the slide rail assembly, the gear having a plurality of teeth configured to be engaged with the plurality of teeth of the rack; and a flexible member connected to the rack for providing an elastic force. Wherein, the gear is configured to be detached from the first end part of the rack when the second rail is moved relative to the first rail to a predetermined open position along a first direction. Wherein, the flexible member is configured to rotate the gear to be engaged with the rack again during a process of the second rail being moved relative to the first rail from the predetermined open position along a second direction.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
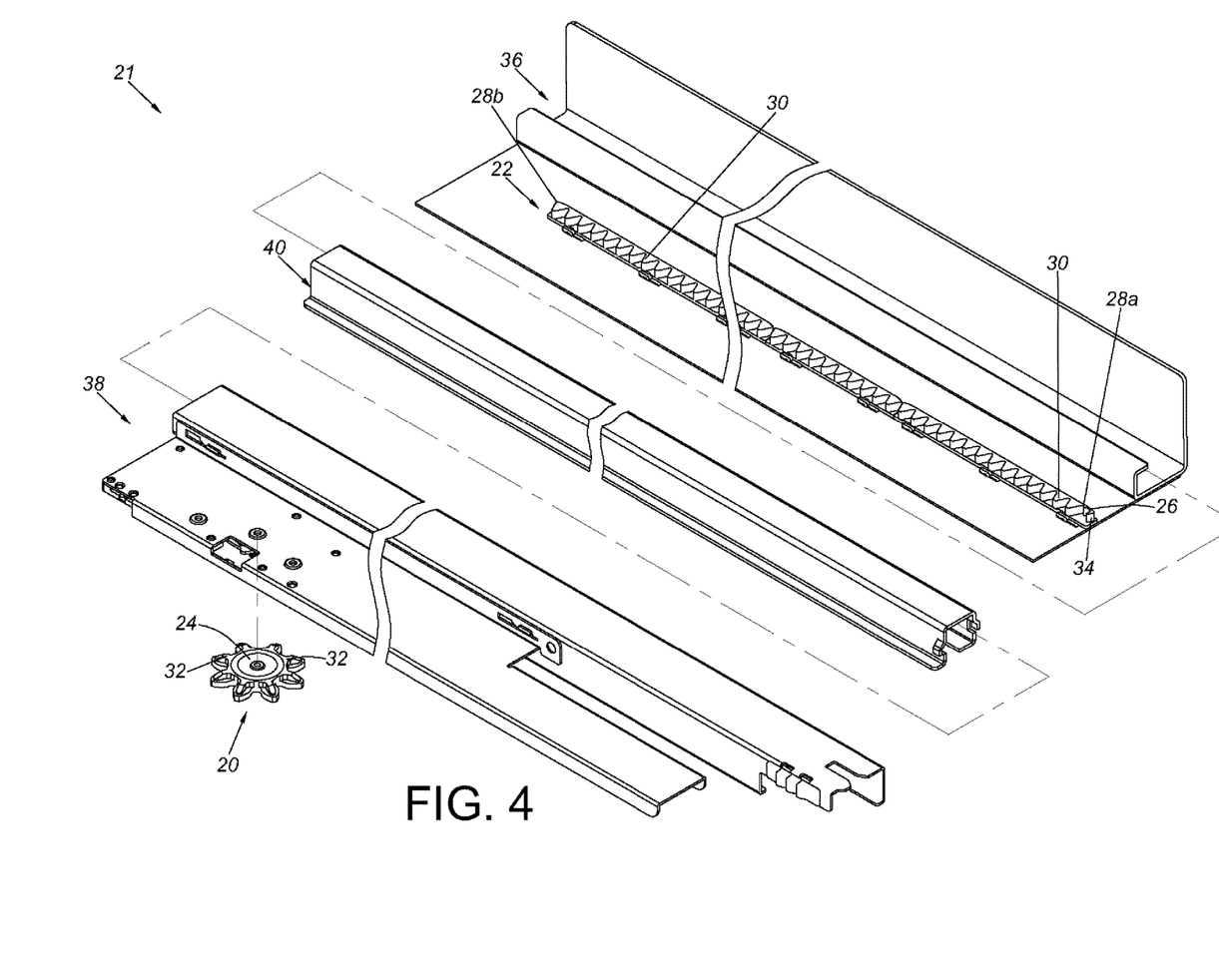
FIG. 4 is an exploded view of a gear arrangement applied to a slide rail assembly according to an embodiment of the present invention.
Figure 5:
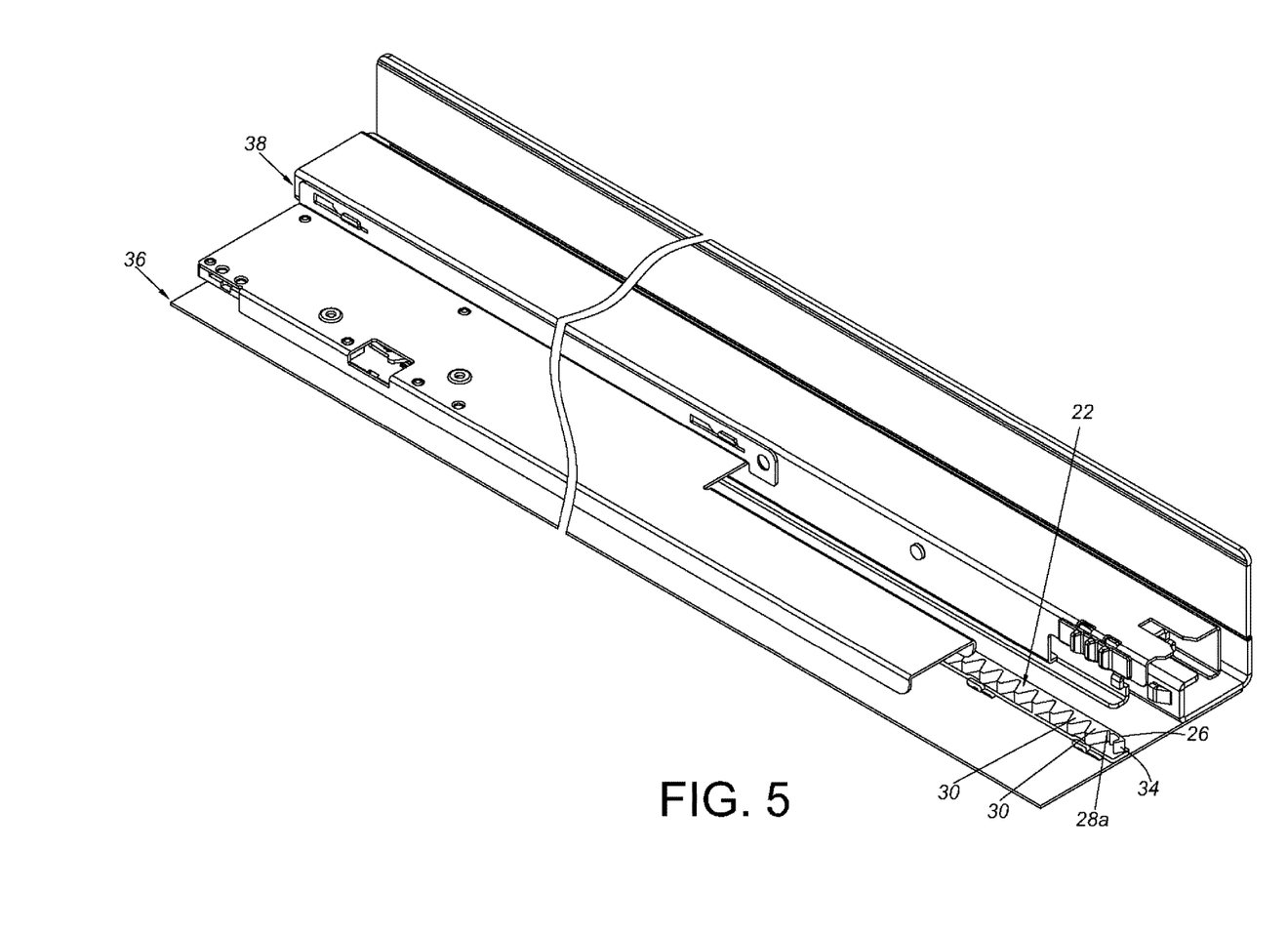
FIG. 5 is a diagram showing an assembly of the gear arrangement and the slide rail assembly according to an embodiment of the present invention.

As shown in FIG. 4 and FIG. 5, a gear arrangement 20 is arranged on a furniture assembly, such as a slide rail assembly 21 according to an embodiment of the present invention. The gear arrangement 20 comprises a rack 22, a gear 24, and a flexible member 26 attached to the rack 22. The slide rail assembly 21 comprises a first rail 36, a second rail 38 and a third rail 40. Wherein, the first rail 36 is a fixed rail, the second rail 38 is movable relative to the first rail 36 and can be seen as a movable rail. The third rail 40 is movably mounted between the first rail 36 and the second rail 38 for extending a traveling distance of the second rail 38 relative to the first rail 36.

The rack 22 is fixedly mounted to one of the first rail 36 and the second rail 38. In the present embodiment, the rack 22 is fixedly mounted to the first rail 36, and arranged along a longitudinal direction of the first rail 36. The rack 22 has a first end part 28a and a second end part 28b opposite to the first end part 28a. A plurality of teeth 30 is arranged between the first end part 28a and the second end part 28b.

The gear 24 is rotatably mounted to the other one of the first rail 36 and the second rail 38. In the present embodiment, the gear 24 is rotatably mounted to the second rail 38. The gear 24 has a plurality of teeth 32 configured to be engaged with the plurality of teeth 30 of the rack 22 for transmission.

Figure 6:
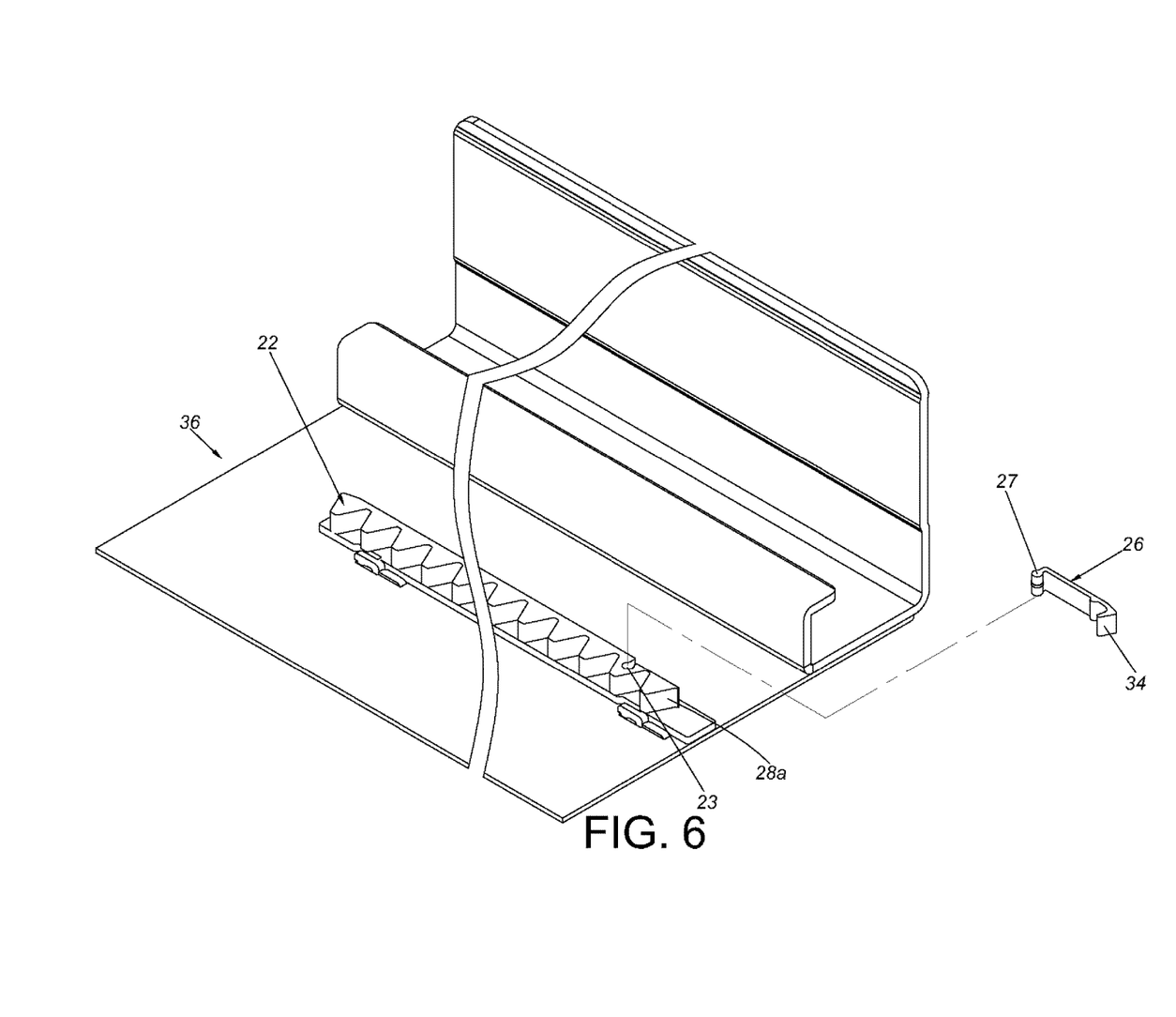
FIG. 6 is an exploded view of a flexible member and a rack according to an embodiment of the present invention.
Figures 7, 8:
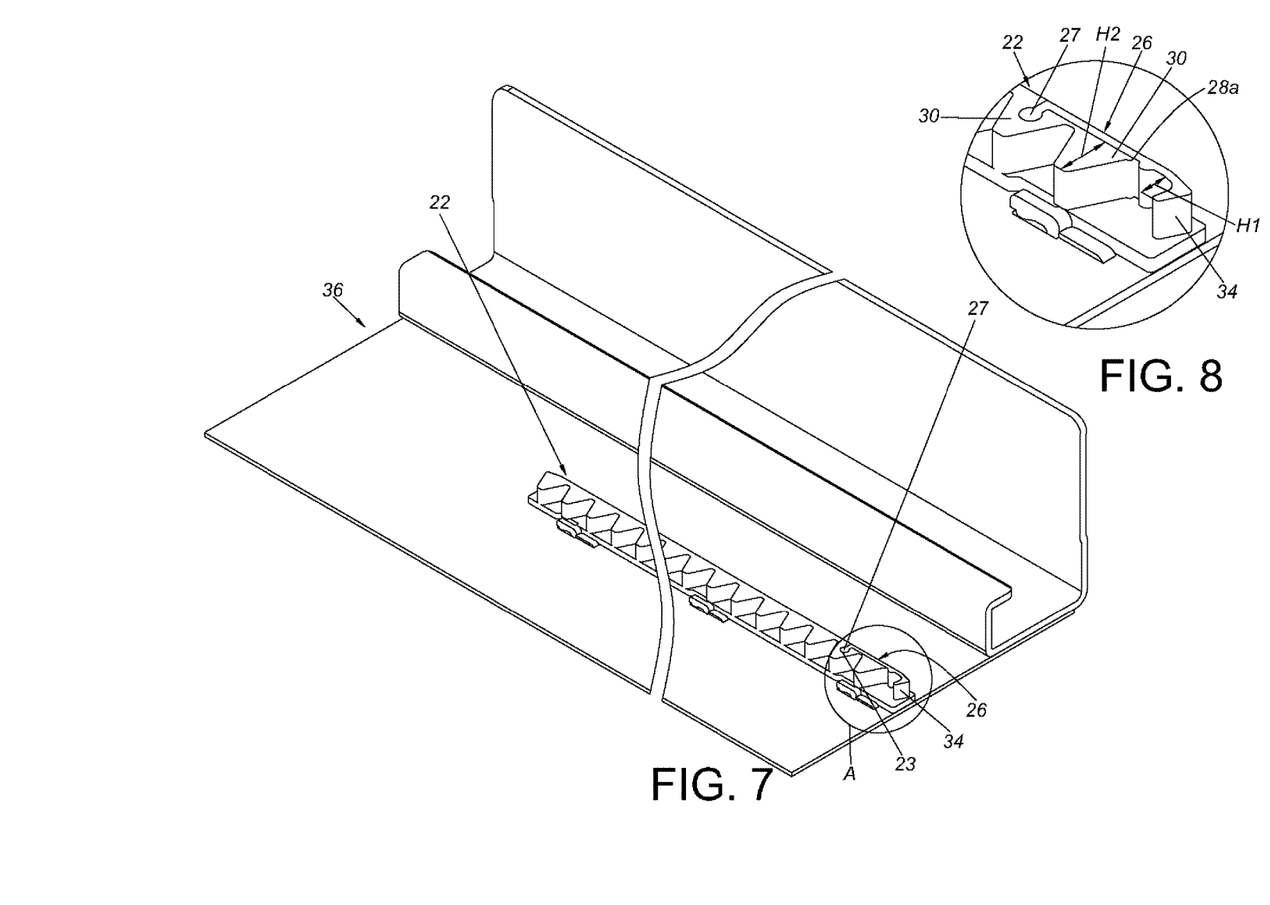
FIG. 7 is a diagram showing an assembly of the flexible member and the rack according to an embodiment of the present invention.
FIG. 8 is an enlarged view of an area A of FIG. 7.

As shown in FIG. 6 and FIG. 7, the flexible member 26 is an independent component connected to the first end part 28a of the rack 22. The rack 22 is arranged with a first connecting feature 23, and the flexible member 26 is arranged with a second connecting feature 27 for connecting to the first connecting feature 23. Preferably, the first connecting feature 23 and the second connecting feature 27 can be a combination of concave (such as a hole or a groove) and convex structures engaged with each other, such that the flexible member 26 can be detachably connected to the rack 22. Preferably, the flexible member 26 is made of a plastic material and the flexible member 26 has a flexible part 34 longitudinally extended from a tooth 30 adjacent to the first end part 28a of the rack 22. On the other hand, the flexible member 26 and the rack 22 can be integrally formed in one piece in other embodiment, but the present invention is not limited thereto.

Preferably, as shown in FIG. 8, a height H1 of the flexible part 34 is smaller than a height H2 of each of the teeth 30 of the rack 22, but the present invention is not limited thereto.

Figure 9:
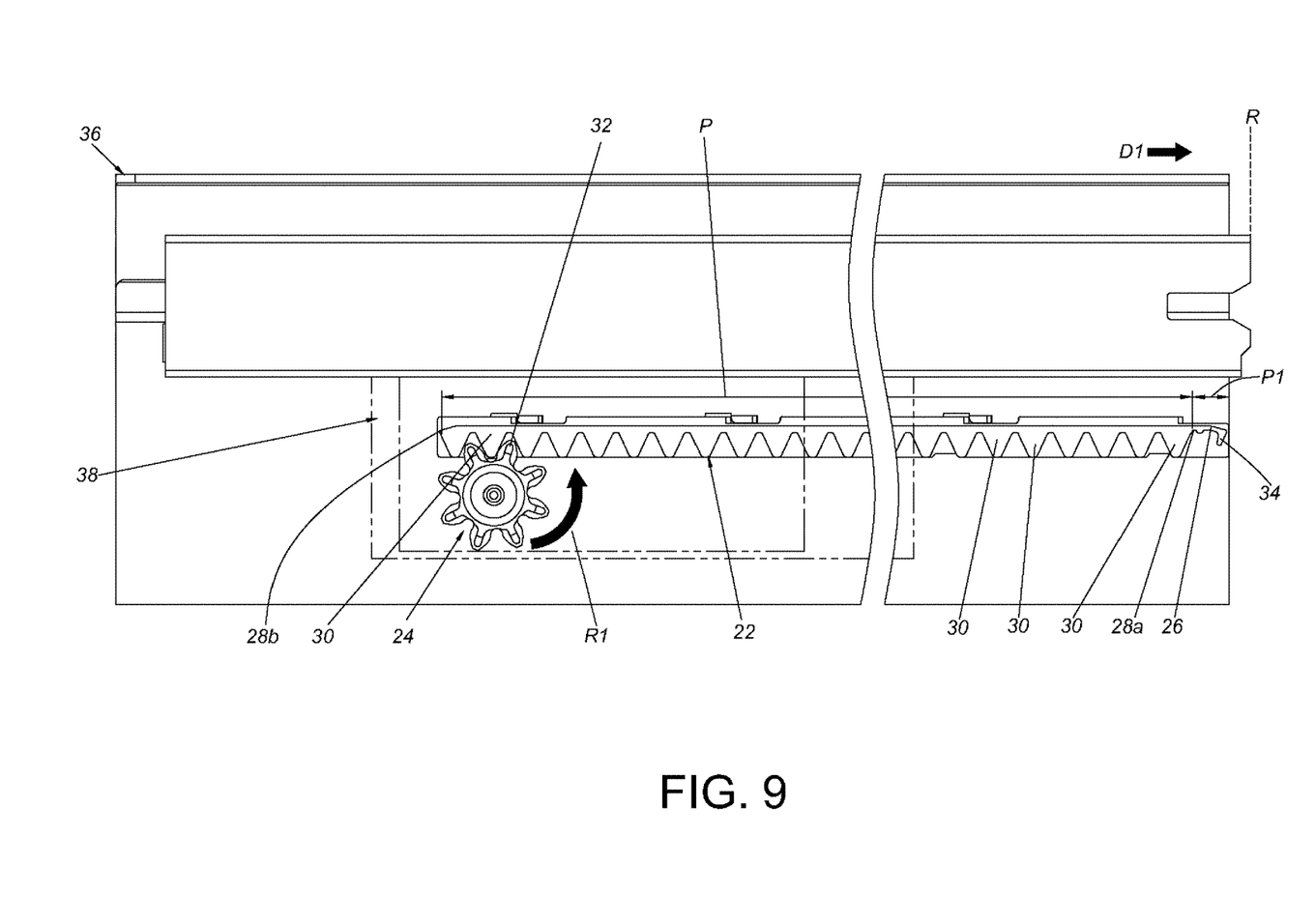
FIG. 9 is a diagram showing the gear being engaged with the rack and rotated along a first rotation direction when a second rail of the slide rail assembly is moved relative to a first rail along a first direction according to an embodiment of the present invention.

As shown in FIG. 9, when the second rail 38 is located at a retracted position R relative to the first rail 36, the gear 24 is engaged with the teeth 30 adjacent to the second end part 28b of the rack 22. Wherein, the gear 24 is movable along a linear path P through the teeth 30 of the rack 22. The flexible member 26 extends a longitudinal length P1 from the first end part 28a of the rack 22 along a direction of the linear path P.

When the second rail 38 is moved relative to the first rail 36 from the retracted position R along a first direction D1, the gear 24 is moved along the linear path P along the first direction D1 through the teeth 30 of the rack 22. During such process, the gear 24 is rotated relative to the second rail 38 along a first rotation direction R1.

Figure 10:
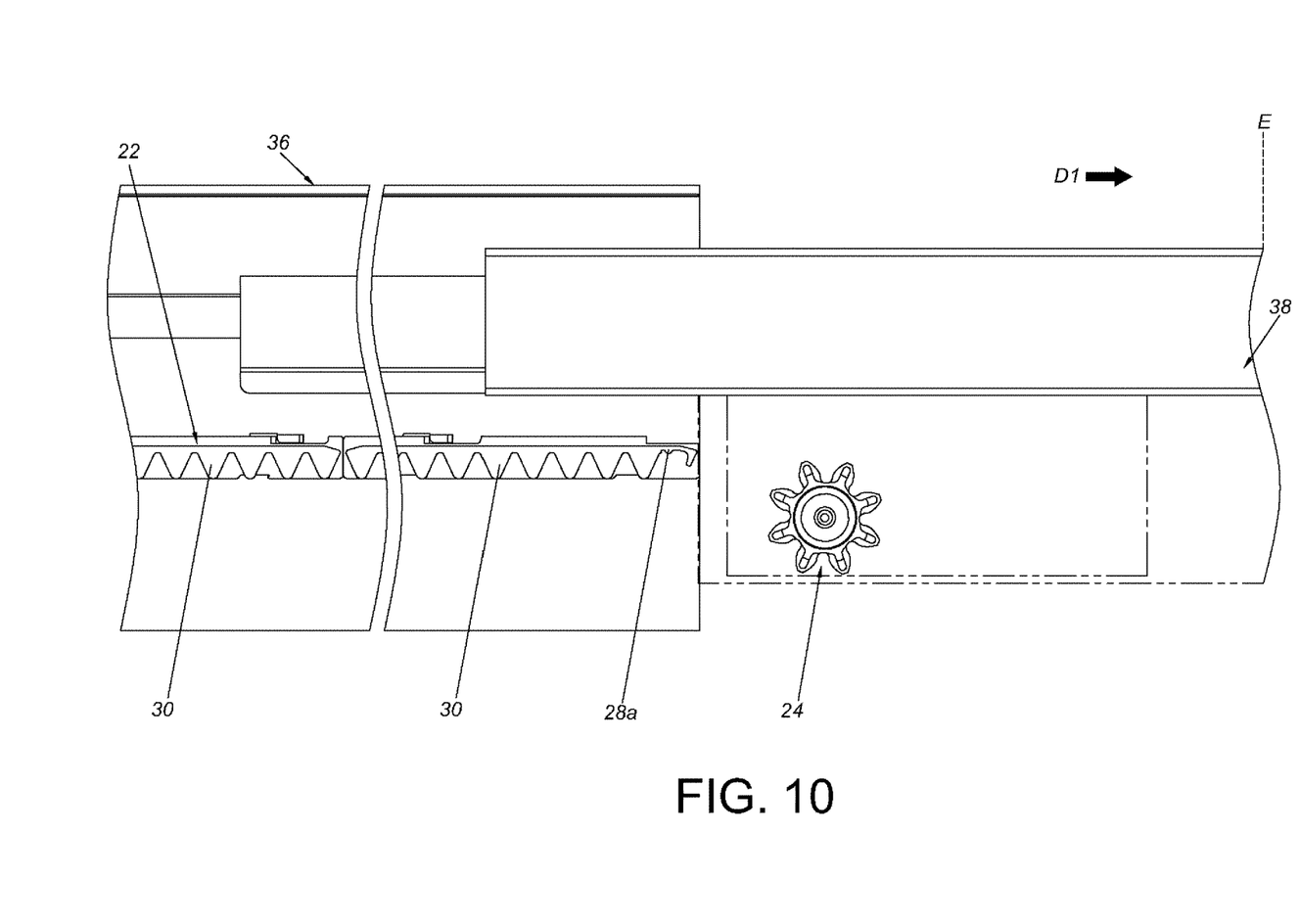
FIG. 10 is a diagram showing the second rail of the slide rail assembly being located at a predetermined open position relative to the first rail with the gear no longer engaged with the rack according to an embodiment of the present invention.

As shown in FIG. 10, when the second rail 38 is moved relative to the first rail 36 along the first direction D1 to a predetermined open position E, the gear 24 is detached from the first end part 28a of the rack 22, such that the gear 24 is no longer engaged with the rack 22.

Figure 11:
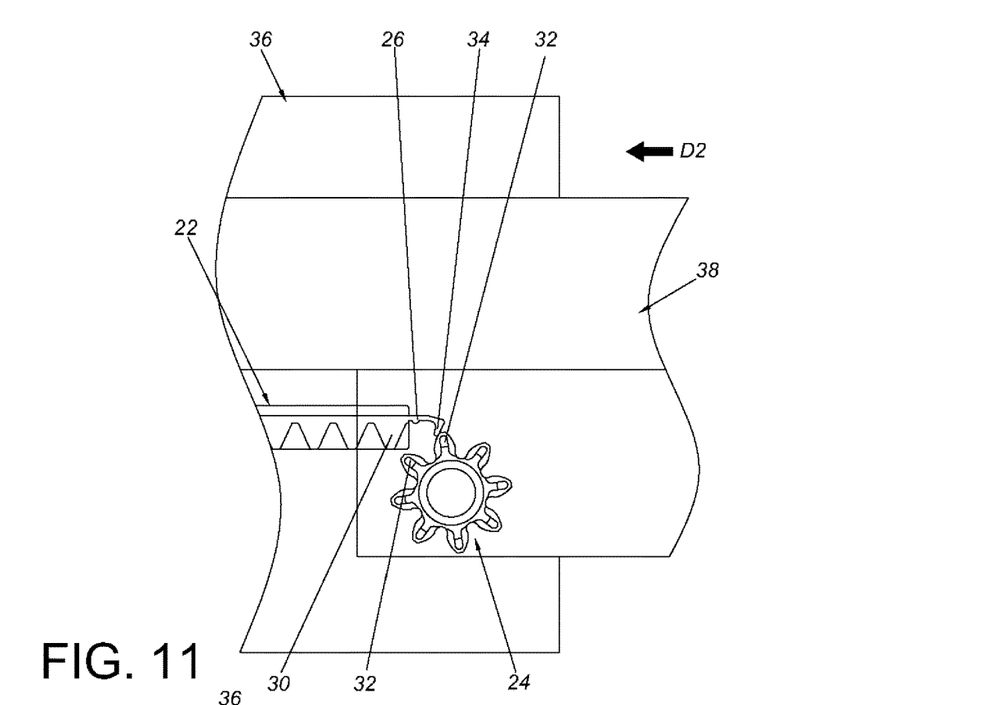
FIG. 11 is a diagram showing the gear contacting the flexible member during a process of the second rail of the slide rail assembly being moved relative to the first rail from the predetermined open position along a second direction according to an embodiment of the present invention.
Figure 12:
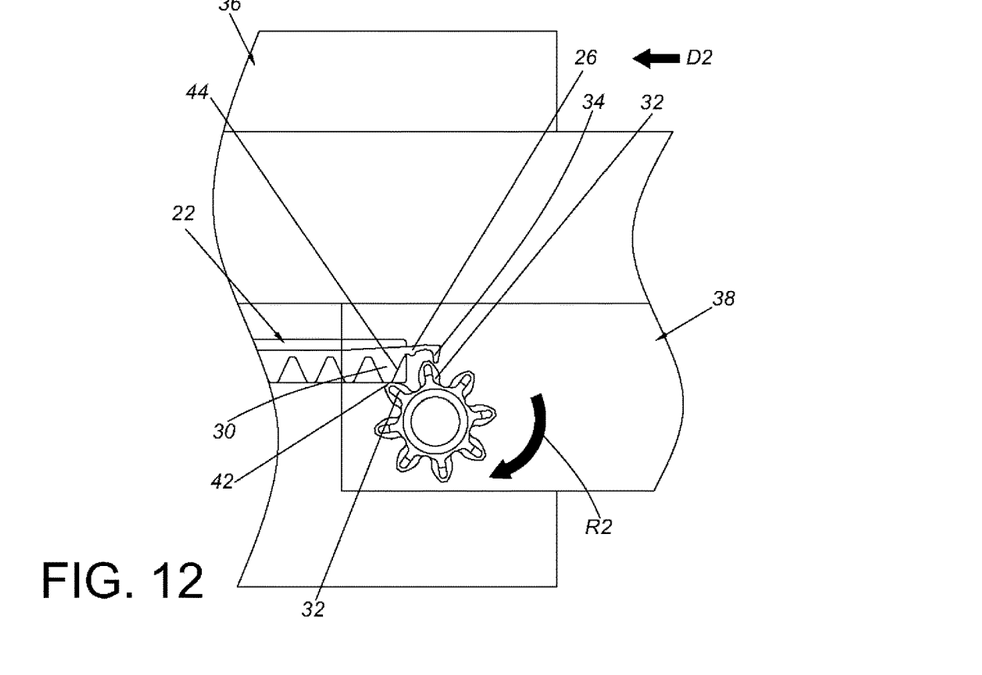
FIG. 12 is a diagram showing the gear being rotated along a second rotation direction in response to an elastic force of the flexible member during the process of the second rail of the slide rail assembly being moved relative to the first rail from the open position along the second direction according to an embodiment of the present invention.
Figure 13:
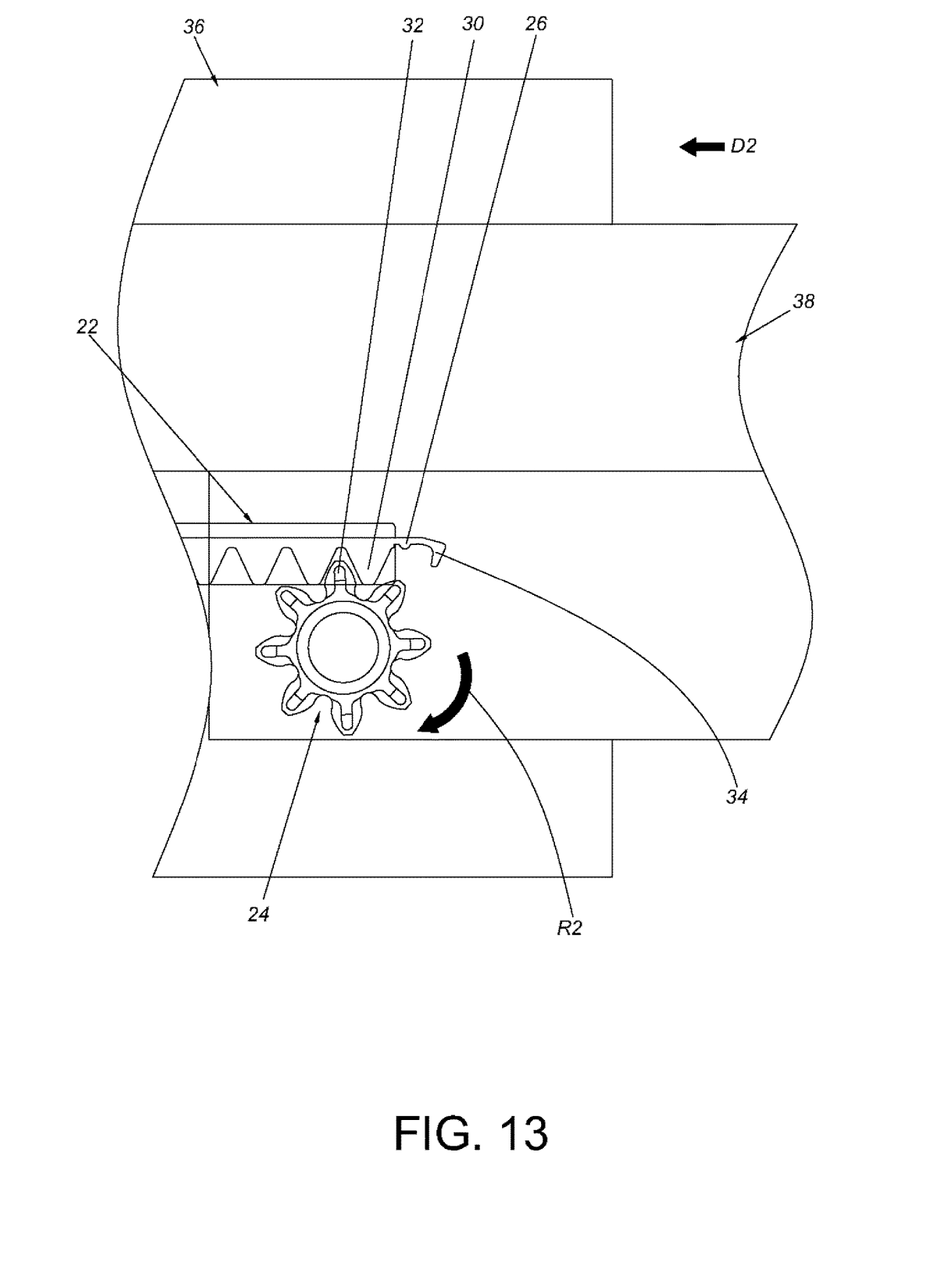
FIG. 13 is a diagram showing the gear being engaged with the rack again during the process of the second rail of the slide rail assembly being moved relative to the first rail from the open position along the second direction according to an embodiment of the present invention.

As shown in FIG. 11 to FIG. 13, during a process of the second rail 38 being moved relative to the first rail 36 from the predetermined open position along a second direction D2 (opposite to the first direction D1), the gear 24 is rotated in response to an elastic force provided by the flexible part 34 of the flexible member 26, in order to reduce the possibility that a tip 42 of one of the teeth 32 of the gear 24 directly impacts a lateral side 44 of one of the teeth 30 (a first tooth) adjacent to the first end part 28a of the rack 22 at a vertical angle, such that noise and jolt during re-engagement of the gear 24 and the rack 22 can be reduced.

Figure 14:
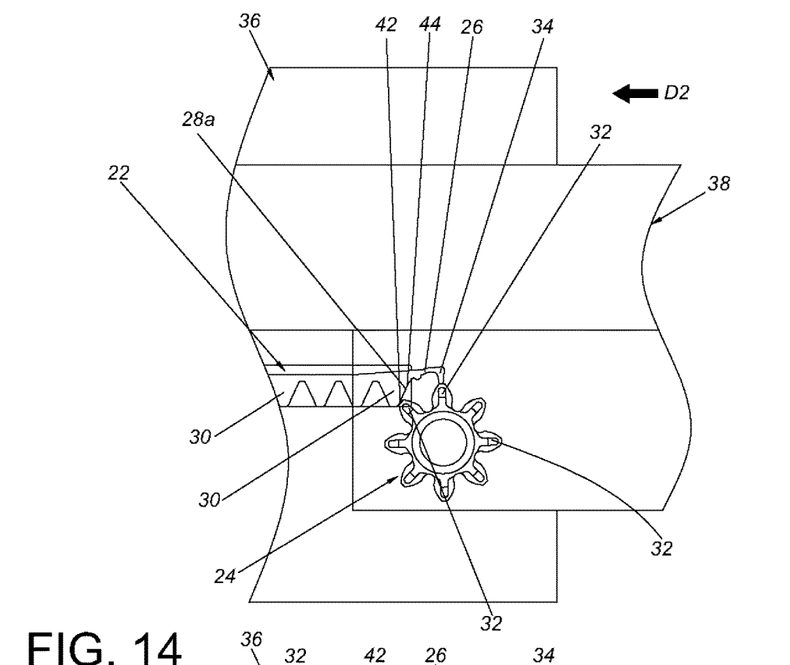
FIG. 14 is a diagram showing another situation that the gear contacting the flexible member during the processing of the second rail of the slide rail assembly being moved relative to the first rail from the predetermined open position along the second direction according to an embodiment of the present invention.
Figure 15:
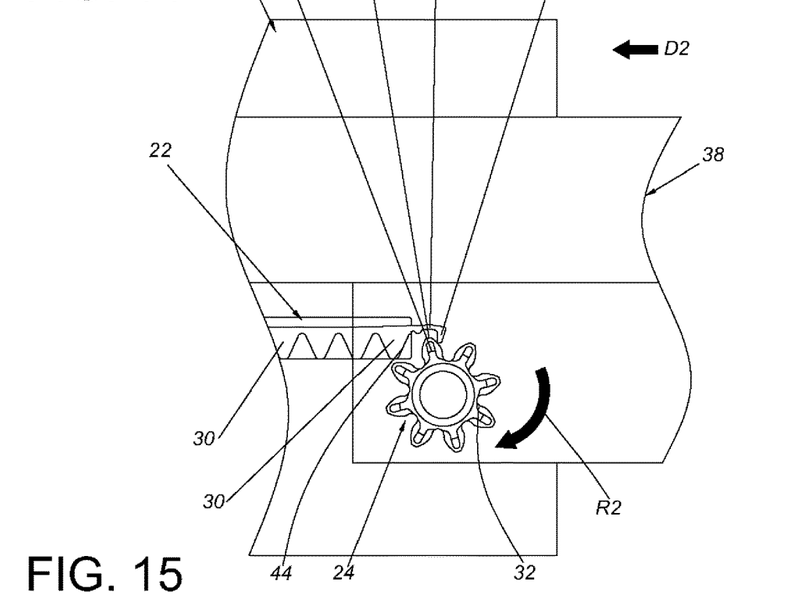
FIG. 15 is a diagram showing the gear being rotated along the second rotation direction in response to the elastic force of the flexible member during the process of the second rail of the slide rail assembly being moved relative to the first rail from the predetermined open position along the second direction according to an embodiment of the present invention.

As shown in FIG. 14 and FIG. 15, in another situation, during the processing of the second rail 38 being moved relative to the first rail 36 from the predetermined open position E along the second direction D2, one of the teeth 32 of the gear 24 may abut against a portion of the flexible member 26, such as abutting against a tip of the flexible part 34, such that the flexible member 26 can provide an elastic force to the gear 24. Accordingly, the gear 24 is slightly rotated relative to the second rail 28 along a second rotation direction R2, in order to reduce the possibility that a tip 42 of one of the teeth 32 of the gear 24 directly impacts the lateral side 44 of the first teeth adjacent to the first end part 28a of the rack 22 at the vertical angle, such that noise and jolt during re-engagement of the gear 24 and the rack 22 can be reduced or prevented.

Therefore, the flexible member 26 is configured to rotate the gear 24 for reducing or preventing the noise and jolt caused by re-engagement of the gear 24 with the rack 22.

The gear arrangement of the present invention is characterized in that:
1. The flexible member 26 is arranged adjacent to the first end part 28a of the rack 22 for providing an elastic force, in order to reduce or prevent the noises and jolt during re-engagement of the gear 24 and the rack 22.
2. The flexible member 26 can be detachably connected to the rack, such that a user can selectively connect the flexible member 26 to the rack 22 according to requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gear arrangement, comprising:
   a rack having a first end part and a second end part opposite to the first end part, a plurality of teeth being arranged between the first end part and the second end part;
   a gear having a plurality of teeth configured to be engaged with the plurality of teeth of the rack, the gear being configured to be detachable from the rack; and
   a flexible member arranged on the rack, the flexible member comprising an extended part and a flexible part, the extended part extending in a longitudinal direction away from a tooth adjacent to the first end part of the rack, the flexible part being connected to the extended part, and a space being defined by the tooth adjacent to the first end part of the rack, the extended part and the flexible part;
   wherein the flexible part and the extended part are connected to form a hook structure, and the space defined by the tooth adjacent to the first end part of the rack, the extended part and the flexible part is U-shaped;
   wherein the gear is rotated in response to an elastic force provided by the flexible part of the flexible member, such that a tip of one of the teeth of the gear passes through the space without engaging with the extended part of the flexible member.

2. The gear arrangement of claim 1, wherein a height of the flexible part of the flexible member is smaller than a height of each of the teeth of the rack.

3. The gear arrangement of claim 1, wherein the flexible member is detachably connected to the rack.

4. The gear arrangement of claim 3, wherein a first connecting feature is arranged on the rack, a second connecting feature is arranged on the flexible member, the first connecting feature and the second connecting feature are a combination of concave and convex structures engaged with each other.

5. The gear arrangement of claim 1, wherein the flexible member and the rack are integrally formed in one piece.

6. A gear arrangement, applicable to a slide rail assembly, the gear arrangement comprising:
   a rack configured to be fixedly mounted to a first rail of the slide rail assembly, and arranged along a longitudinal direction of the first rail, the rack having a first end part and a second end part opposite to the first end part, a plurality of teeth being arranged between the first end part and the second end part;
   a gear configured to be rotatably mounted to a second rail of the slide rail assembly, the gear having a plurality of teeth configured to be engaged with the plurality of teeth of the rack; and
   a flexible member connected to the rack for providing an elastic force, the flexible member comprising an extended part and a flexible part, the extended part extending in a longitudinal direction away from a tooth adjacent to the first end part of the rack, the flexible part being connected to the extended part, and a space being defined by the tooth adjacent to the first end part of the rack, the extended part and the flexible part;
   wherein the flexible part and the extended part are connected to form a hook structure, and the space defined by the tooth adjacent to the first end part of the rack, the extended part and the flexible part is U-shaped;
   wherein the gear is configured to be detached from the first end part of the rack when the second rail is moved relative to the first rail to a predetermined open position along a first direction;
   wherein the flexible member is configured to rotate the gear to be engaged with the rack during a process of the second rail being moved relative to the first rail from the predetermined open position along a second direction;
   wherein the gear is rotated in response to the elastic force provided by the flexible part of the flexible member, such that a tip of one of the teeth of the gear passes through the space without engaging with the extended part of the flexible member.

7. The gear arrangement of claim 6, wherein a height of the flexible part of the flexible member is smaller than a height of each of the teeth of the rack.

8. The gear arrangement of claim 6, wherein the flexible member is detachably connected to the rack.

9. The gear arrangement of claim 8, wherein a first connecting feature is arranged on the rack, a second connecting feature is arranged on the flexible member, the first connecting feature and the second connecting feature are a combination of concave and convex structures engaged with each other.

10. The gear arrangement of claim 6, wherein the flexible member and the rack are integrally formed in one piece.

* * * * *